United States Patent
Cheng et al.

(10) Patent No.: US 7,597,922 B2
(45) Date of Patent: *Oct. 6, 2009

(54) SYSTEM FOR DISPENSING A LIQUID BEVERAGE CONCENTRATE

(75) Inventors: Pu-Sheng Cheng, Dublin, OH (US); Ying Zheng, Dublin, OH (US); Serena Laroia, Dublin, OH (US); Wenjie Hu, Marysville, OH (US); Rachid Rahmani, Marysville, OH (US); Eugene Scoville, New Milford, CT (US); Randall C. Chrisman, Southbury, CT (US); Shannon Gavie, Altadena, CA (US); Walter F. Landry, Morris, CT (US); Brian J. McDonough, Escondido, CA (US); Randall L. Morrison, Sylmar, CA (US); Anthony Klueppel, Dublin, OH (US); Christian Milo, Bussigny (DE)

(73) Assignee: Nestec S.A., Vevey (CH)

( * ) Notice: Subject to any disclaimer, the term of this patent is extended or adjusted under 35 U.S.C. 154(b) by 699 days.

This patent is subject to a terminal disclaimer.

(21) Appl. No.: 10/978,279

(22) Filed: Oct. 28, 2004

(65) Prior Publication Data
US 2005/0178793 A1 Aug. 18, 2005

Related U.S. Application Data

(63) Continuation-in-part of application No. 10/626,369, filed on Jul. 23, 2003, now Pat. No. 7,223,426, which is a continuation of application No. 09/768,784, filed on Jan. 25, 2001, now Pat. No. 6,756,069, which is a continuation-in-part of application No. 09/453,932, filed on May 16, 2000, now Pat. No. 6,319,537, application No. 10/978,279, which is a continuation-in-part of application No. 10/661,432, filed on Sep. 11, 2003, now Pat. No. 7,060,315, and a continuation-in-part of application No. 10/661,397, filed on Sep. 11, 2003, now Pat. No. 6,960,362, and a continuation-in-part of application No. 10/661,388, filed on Sep. 11, 2003, now Pat. No. 7,056,545, which is a continuation of application No. PCT/EP02/03027, filed on Mar. 13, 2002, which is a continuation of application No. PCT/EP02/03026, filed on Mar. 13, 2002, which is a continuation of application No. PCT/EP02/02866, filed on Mar. 13, 2002.

(60) Provisional application No. 60/278,506, filed on Mar. 23, 2001, provisional application No. 60/134,640, filed on May 18, 1999.

(51) Int. Cl.
*A23F 5/00* (2006.01)

(52) U.S. Cl. .................. 426/594; 426/387; 426/386; 426/432

(58) Field of Classification Search .............. 426/594, 426/432, 386, 387
See application file for complete search history.

(56) References Cited

U.S. PATENT DOCUMENTS 2,420,615 A * 5/1947 Palmer et al. ............... 426/434

(Continued)

FOREIGN PATENT DOCUMENTS

CA 2 321 956 3/2001

(Continued)

OTHER PUBLICATIONS

English Abstract of JP 2000-316457 entitled: Tea Extract Liquid Stable During Long Preservation Period, and its Production (2000).

(Continued)

*Primary Examiner*—Anthony Weier
(74) *Attorney, Agent, or Firm*—Winston & Strawn LLP

(57) ABSTRACT

A beverage system for providing a beverage, methods of making the beverage and the resulting beverage are shown herein. The system includes a beverage-forming concentrate and an aroma or aroma-providing component separated from the concentrate; wherein the concentrate and aroma are combinable upon reconstitution for providing the beverage. The resulting beverage may be coffee, tea, carbonation, a juice, milk, or a non-dairy creamer-based component; or a combination thereof, while the aroma or aroma-providing component is coffee aroma, tea aroma, chocolate or cocoa aroma, malt, Maillard reaction flavor, or a combination thereof.

18 Claims, 2 Drawing Sheets

U.S. PATENT DOCUMENTS

| | | | |
|---|---|---|---|
| 2,927,522 A | 3/1960 | Rockwood et al. | 99/290 |
| 3,200,997 A | 8/1965 | Creswick | 222/145 |
| 3,418,134 A * | 12/1968 | Rooker | 426/386 |
| 3,421,906 A * | 1/1969 | Reich et al. | 426/319 |
| 3,438,551 A | 4/1969 | Belisle | 222/182 |
| 3,558,020 A | 1/1971 | Russell | 222/416 |
| 3,565,244 A * | 2/1971 | Wakefield | 206/219 |
| 3,643,835 A | 2/1972 | Popinski | 222/56 |
| 3,717,472 A * | 2/1973 | Strobel | 426/594 |
| 3,727,799 A | 4/1973 | Nixon | 222/129.4 |
| 3,810,999 A | 5/1974 | Balling et al. | 426/362 |
| 3,966,986 A | 6/1976 | Hunter et al. | 426/534 |
| 3,997,685 A * | 12/1976 | Strobel | 426/594 |
| 4,008,340 A * | 2/1977 | Kung et al. | 426/651 |
| 4,316,557 A | 2/1982 | Benoum et al. | 222/129 |
| 4,467,941 A * | 8/1984 | Du | 222/1 |
| 4,579,048 A | 4/1986 | Stover | 99/280 |
| 4,913,316 A | 4/1990 | Richter | 221/1 |
| 5,087,469 A | 2/1992 | Acree | 426/544 |
| 5,182,926 A | 2/1993 | Carns et al. | 62/352 |
| 5,346,097 A | 9/1994 | Melland et al. | 222/132 |
| 5,384,143 A | 1/1995 | Koyama et al. | 426/546 |
| 5,676,041 A | 10/1997 | Glucksman et al. | 99/286 |
| 5,688,545 A | 11/1997 | Sanders et al. | 426/120 |
| 5,797,519 A | 8/1998 | Schroeder et al. | 222/129.1 |
| 5,848,732 A | 12/1998 | Brugger | 206/725 |
| 5,853,787 A * | 12/1998 | Gurol | 426/595 |
| 5,897,703 A | 4/1999 | Hatakeyama et al. | 106/696 |
| 5,952,032 A | 9/1999 | Mordini et al. | 426/597 |
| 5,971,210 A * | 10/1999 | Brugger | 222/137 |
| 5,980,969 A | 11/1999 | Mordini et al. | 426/597 |
| 5,997,929 A | 12/1999 | Heeb et al. | 426/433 |
| 6,056,989 A * | 5/2000 | Sasagawa et al. | 426/590 |
| 6,120,825 A | 9/2000 | Cirialiano et al. | 426/435 |
| 6,182,555 B1 | 2/2001 | Scheer et al. | 99/290 |
| 6,250,208 B1 | 6/2001 | Helps et al. | 99/299 |
| 6,319,537 B1 * | 11/2001 | Cheng et al. | 426/594 |
| 6,413,570 B1 | 7/2002 | Lehmberg | 426/597 |
| 6,423,361 B1 | 7/2002 | Lehmberg | 426/597 |
| 6,423,362 B1 | 7/2002 | Lehmberg | 426/597 |
| 6,685,059 B2 | 2/2004 | Jones et al. | 222/129.1 |
| 6,792,847 B2 | 9/2004 | Tobin et al. | 99/275 |
| 2002/0043540 A1 | 4/2002 | Baudin | 222/321.2 |
| 2002/0074684 A1 | 6/2002 | Baggot et al. | 264/132 |
| 2002/0087350 A1 | 7/2002 | Miida et al. | 705/1 |
| 2002/0119235 A1 * | 8/2002 | Zeller et al. | 426/594 |
| 2002/0145008 A1 | 10/2002 | Jones et al. | 222/146.5 |
| 2003/0053199 A1 | 3/2003 | Akasaka et al. | 359/341.3 |
| 2003/0097497 A1 | 5/2003 | Esakov et al. | 710/16 |
| 2003/0116025 A1 | 6/2003 | Tobin | 99/279 |
| 2003/0230597 A1 | 12/2003 | Naik | 222/129.1 |
| 2004/0050259 A1 | 3/2004 | Tobin et al. | 99/485 |
| 2004/0056046 A1 | 3/2004 | Jones et al. | 222/129.3 |
| 2004/0086620 A1 | 5/2004 | Tobin et al. | 426/597 |

FOREIGN PATENT DOCUMENTS

| | | |
|---|---|---|
| CA | 2321956 | 3/2001 |
| DE | 3220693 | 8/1983 |
| EP | 0 489 401 | 6/1992 |
| EP | 0 861 596 | 9/1998 |
| EP | 0 893 065 | 1/1999 |
| EP | 0 934 702 | 8/1999 |
| GB | 1 306 017 | 2/1973 |
| GB | 2 057 894 | 4/1981 |
| WO | WO00/47058 | 8/2000 |
| WO | WO00/57713 | 10/2000 |
| WO | WO01/12033 | 2/2001 |
| WO | WO02/087350 | 11/2002 |
| WO | WO03/053199 | 7/2003 |

OTHER PUBLICATIONS

R. S. Ramteke et al., "Effect of Additives on the Stability of Mango Aroma Concentrate During Storage", J. Food Sci. Technol., vol. 34, No. 3., pp. 195-199 (1997).

* cited by examiner

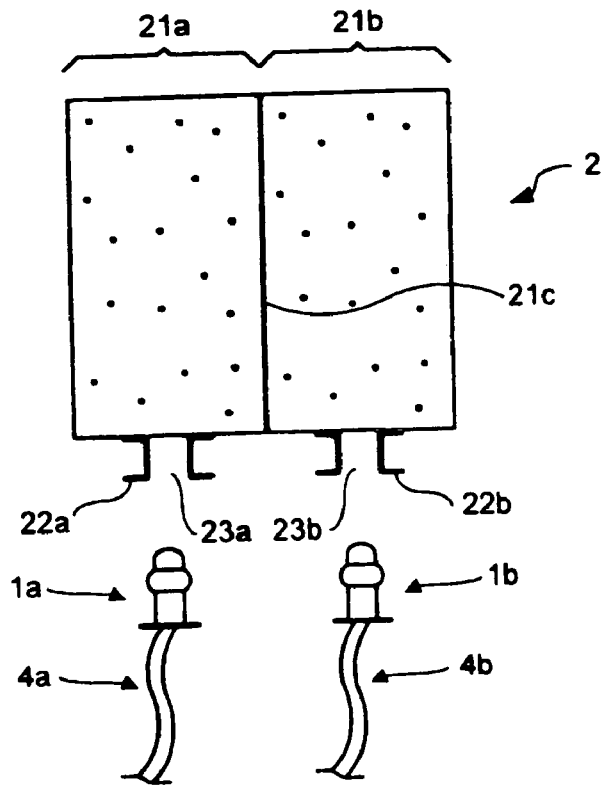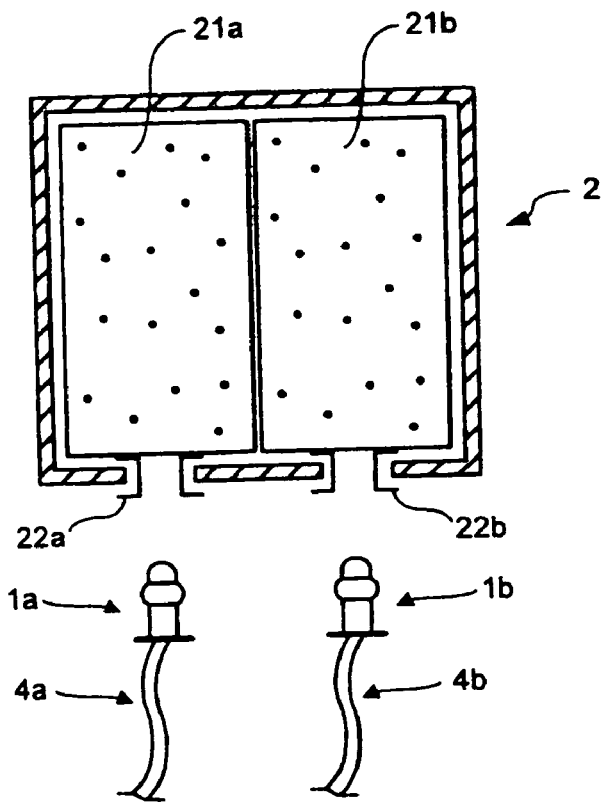

SYSTEM FOR DISPENSING A LIQUID BEVERAGE CONCENTRATE

CROSS-REFERENCE TO RELATED APPLICATIONS

This application is a continuation-in-part of U.S. patent application Ser. No. 10/626,369, filed on Jul. 23, 2003, now U.S. Pat. No. 7,223,426, which is a continuation of U.S. patent application Ser. No. 09/768,784, filed Jan. 25, 2001, now U.S. Pat. No. 6,756,069, which is a continuation-in-part of U.S. patent application Ser. No. 09/453,932, filed May 16, 2000, now U.S. Pat. No. 6,319,537 which claims the benefit of provisional application No. 60/134,640, filed May 18, 1999. This application also is a continuation-in-part of U.S. patent applications Ser. Nos. 10/661,388 filed Sep. 11, 2003, now U.S. Pat. No. 7,056,545, which is a continuation of International Application PCT/EP02/02866 filed Mar. 13, 2002; Ser. No. 10/661,397 filed Sep. 11, 2003, now U.S. Pat. No. 6,960,362, which is a continuation of International Application PCT/EP02/03026 filed Mar. 13, 2002; and Ser. No. 10/661,432 filed Sep. 11, 2003, now U.S. Pat. No. 7,060,315, which is a continuation of International Application PCT/EP02/03027 filed Mar. 13, 2002, each of which claims priority to U.S. provisional application Ser. No. 60/278,506, filed Mar. 23, 2001. The content of each document mentioned above is expressly incorporated herein by reference thereto.

FIELD OF THE INVENTION

The present invention is related to a device and method for dispensing dual component liquids or concentrates packaged in separate compartments or containers. The liquids or concentrates can be mixed together, optionally diluted with another liquid, such as water, and then dispensed through a pumping system, to provide a consumable beverage. The invention also relates to a beverage system containing a stable beverage concentrate and separately stored aroma or aroma-providing component, e.g., coffee or tea concentrate and coffee or tea aroma. The separately stored components may be reconstituted to provide an aromatized beverage. The invention further relates to a method for providing the beverage system and beverage and to the resultant products.

BACKGROUND OF THE INVENTION

Containers used in the packaging art for storing and dispensing liquids generally include a sealed polymeric bag or pouch. There are a variety of pouches known in the art, particularly for storing liquids or concentrates.

U.S. Pat. No. 4,523,697 to Jeans discloses a container for dispensing a concentrate at a predetermined flow rate. The container also includes two mating assemblies, mating at an outlet valve, and a tube in its interior to permit controlled pressurization to the volume in the container.

U.S. Pat. No. 4,709,835 to Kruger et al. discloses a disposable pouch for beverage syrups and concentrates including a collapsible bag, a discharge spout, and an insert that can be broken off when a dosing valve assembly is attached. The pouch has utility in a postmix beverage dispenser.

U.S. Pat. No. 5,307,955 to Viegas discloses a flaccid-bottom, lightweight delivery package for dispensing fluid products. The package contains a self-sealing dispensing valve and is particularly useful for storing and dispensing viscous fluid materials.

Additionally, it may be useful to mix two liquid or concentrate components together, especially to create a beverage for consumption. This mixing may occur during storage or upon dispensing. The two liquids or concentrates can be simply placed together after dispensation, dispensed together without added mixing, or dispensed together with intimate mixing. For example, U.S. Pat. Nos. 4,204,775 and 4,316,673 to Speer each disclose a mixing device that uses a tortuous path to shear, fold, mix, and blend together a two-part fluid compound.

Beverages made from individual components are generally mixed together and dispensed by a dispensing system. Dispensing systems may be manual or automatic and may operate continuously or in discrete dispensation steps. Liquid dispensation systems typically involve at least a liquid receptacle for holding the liquid and a pump for dispensing the liquid into a consumable portion. A variety of liquid dispensing systems are commercially available and disclosed in the prior art.

U.S. Pat. Nos. 4,306,667; 4,359,432; and 4,376,496, as well as U.S. Reissue Pat. No. RE 32,179 all to Sedam et al., disclose a post-mix carbonated beverage dispensing system for used in refrigerated cabinets. The dispensing system contains a carbonator with a refillable water reservoir, a $CO_2$ system, a valving system, and a disposable package for containing and dispensing the post-mix beverage syrup.

U.S. Pat. No. 4,564,127 to Garabedian et al. discloses a liquid dispenser system containing a collapsible bag with a self-sealing valve and clips to engage the dispenser, clip-receiving structures to engage the bag clips and open or close the valve, a pump, support for the bag, and a frame.

U.S. Pat. No. 4,901,886 to Kirschner discloses a post-mix juice dispensing system including a bag-in-tank system for reconstituting and dispensing a juice concentrate at freezer temperatures. The bag-in-tank system includes a pressurizable canister with a slidable carrier capable of forcing concentrate out of a flexible bag under pressure and placed therein.

U.S. Pat. No. 5,368,195 to Pleet et al. discloses a pressurized bag-in-bottle fluid dispenser system for accurately delivering a viscous or semi-viscous liquid. The dispenser system is particularly suited for dispensing condiments, paints, pigments, or adhesives and includes a metering unit activated by a manually operated trigger on a gun.

U.S. Pat. Nos. 5,615,801 and 5,735,436 to Schroeder et al. disclose a disposable and recyclable juice concentrate package for a post-mix juice dispenser. The dispenser includes a pump that provides a continuous stream of concentrate, a package housing containing a container housing and a pump housing, and an integral mixing nozzle. It is suggested that the continuous streaming of the concentrate into the mixing chamber of the dispenser improves mixing.

U.S. Pat. No. 5,803,312 to Credle, Jr. et al. discloses a manually operated, postmix juice dispenser. This low cost dispenser is used with a disposable concentrate package and includes a water tank, a water pump, and a pump handle. The disposable concentrate package for use with this system is generally a flexible pouch with a built-in concentrate pump that connects to the handle.

In some circumstances, two liquids may be dispensed together by the same apparatus. A single apparatus that allows mixing of two liquids results in effectively a better mixed consumer beverage product. The two liquids can be dispensed, for example, using a dual liquid dispenser package, as disclosed in U.S. Pat. No. 4,774,057 to Uffenheimer et al. This patent discloses a dispenser package containing two separate liquid dispensing chambers, two liquid reservoirs, and liquid supply channels connecting the reservoirs to the chambers.

Coffee products, which are in a form convenient for the consumer, are commonly available as soluble beverage powders and ready-to-drink liquid beverages.

Coffee products in the form of soluble beverage powders may be of extremely high quality; to the point were they provide a beverage very similar to freshly brewed beverages. Despite this, they are still perceived as being inferior to freshly brewed coffee. Also, the fact that soluble beverage powders are in powder form creates problems in many food service applications where the product is dispensed from a machine. In particular, problems such as mechanical degradation of the powder, bridging, and blocking occur. Refilling of the dispensing device with powdered products may also require manual operation and cleaning and may cause loss of refill material in loading the machine's hopper.

Ready-to-drink liquid coffee beverages are very popular in Asian markets. The beverages are made up of soluble coffee solids, stabilizers, water and, usually, sugar. For whitened beverages, a creamer or whitener may be included. Ordinarily, these beverages have a soluble coffee solids concentration of about 1% by weight. These beverages are very often consumed cold and, in general, have organoleptic properties which are different than freshly brewed coffee. Therefore they do not, and in fact are not intended to, provide a substitute to freshly brewed coffee.

There have also been attempts to provide convenient coffee products in fluid concentrate form. In theory, a coffee concentrate offers the advantages of being perceived to have better quality than soluble beverage powders, and being simple to apply in food service applications. Unfortunately, liquid coffee concentrates are unstable and this has severely limited their application. One problem appears to be the increase of acidity over time which negatively influences the quality of the beverage reconstituted from the coffee concentrate. Also, curdling of whitener or creamer components may occur.

Attempts have been made to avoid or reduce the acidity increase by adding base to the concentrate. For example, European Patent Application No. EP0861596 describes treating a coffee concentrate with alkali to convert acid precursors to their acid salts, and then neutralizing the treated concentrate with acid to bring the pH to about 4.7 to 5.3. This process is described to convert the acid precursors to stable salts and hence prevent the formation of acid during storage.

Another possible method of avoiding or reducing the acidity increase in aromatized coffee concentrates is to increase concentration to above about 55%. This is described in European Patent Application No. EP0893065.

When dispensing beverages including two or more fluids, it is desirable that the at least two fluids be stored apart and be easily mixed together and with other optional components using a single dispensation system. This can be advantageously accomplished with the aid of a multi-component packing assembly for separate storage of at least two fluid components together, allowing uniformity in packaging and dispensation system design and resulting in simplified shipping and implementation of dispensing a beverage from these at least two fluid components.

SUMMARY OF THE INVENTION

Accordingly, the invention relates to a beverage system for providing a beverage, comprising a beverage-forming concentrate; and an aroma or aroma-providing component separated from the concentrate; wherein the concentrate and aroma are combinable upon reconstitution for providing the beverage. A preferred combination is a beverage concentrate or a tea concentrate and an aroma or aroma-providing component comprising tea aroma. Also, the concentrate may be a coffee base concentrate has a soluble coffee solids concentration of about 10% to about 65% by weight while the aroma or aroma-providing component comprises coffee aroma. Other beverages can be provided from different concentrates or aroma-providing components as further described herein.

The concentrate or the aroma or aroma-providing component can be treated to further enhance the flavor or taste of the beverage. For example, the concentrate can be treated with or can contain an alkali in an amount sufficient to raise the pH of the concentrate by at least 0.5 pH units. Also, the aroma or aroma-providing component can be associated or combined with a stabilizing agent in an amount effective to (a) provide increased amounts of desirable compounds that impart desirable flavor or sensory characteristics to the aroma or aroma-providing component, or (b) reduce the amount of undesirable compounds that suppress desirable flavor characteristics or that contribute to or generate undesirable flavor or sensory characteristics in the aroma or aroma-providing component. Furthermore, the concentrate, the aroma or aroma-providing component, or both components further include an oxygen scavenger. Advantageously, the concentrate, the aroma or aroma-providing component, or both components are stored under frozen or refrigerated conditions.

Another and more preferred way to further enhance the taste and flavor of the resulting beverage is to separately store the concentrate and aroma or aroma-providing component. For example, each can be stored in a separate dispenser container, such as a pouch comprising barrier films. Thus, the concentrate can be stored in a first storage compartment while the aroma or aroma-providing component is stored in a second storage compartment of the dispenser container. Advantageously, each storage compartment can form part of a pouch comprising barrier films.

Another embodiment of the invention relates to a method for improving the storage stability of a beverage concentrate by providing and storing a beverage-forming concentrate separately from an aroma or aroma-providing component, wherein the concentrate is separated from the aroma or aroma-providing component; wherein the concentrate and aroma or aroma-providing component are combinable upon reconstitution for providing a beverage.

In this embodiment, the concentrate and aroma or aroma-providing component are generally combined with a liquid to form the beverage immediately prior to consumption, with the beverage having improved organoleptic properties compared to a beverage formed from beverage-forming concentrates and aromas or aroma-providing components that are stored together. As noted above, a preferred beverage is tea or coffee while a preferred the aroma or aroma-providing component comprises tea aroma or coffee aroma. Of course, other aroma and concentrate components can be used as further described herein.

Another preferred embodiment of the invention relates to a method for delivering a fresh beverage taste to an on-premise beverage at a point of dispensation, comprising the steps of: delivering at least one aroma or aroma-providing component in an amount sufficient to enhance the organoleptic properties of a beverage separately from a beverage concentrate prior to when the beverage is dispensed, and mixing the aroma or aroma-providing compound with a liquid and the beverage concentrate or with a mixture of a beverage concentrate and a liquid when the beverage is being dispensed.

Yet another embodiment, is a beverage prepared from a concentrated beverage-forming component and an aroma-providing component separate from the concentrated beverage-forming component, optionally with a fluid. Preferably, the beverage comprises coffee, tea, carbonation, a juice, milk, or a non-dairy creamer-based component; or a combination thereof, while the aroma or aroma-providing component comprises coffee aroma, tea aroma, chocolate or cocoa aroma, malt, Maillard reaction flavor, or a combination thereof.

BRIEF DESCRIPTION OF THE DRAWINGS

The details of the preferred embodiments of the invention are illustrated in the appended drawing figures, wherein:

FIG. 2 shows a diagrammatic view of a preferred dual packaging assembly and coupling elements for connecting to the dispensation system.

FIG. 3 shows another embodiment of the invention in which the dual packaging assembly has an outer container distinct from the inner compartments containing the components.

DETAILED DESCRIPTION OF THE PREFERRED EMBODIMENTS

Figure 1:
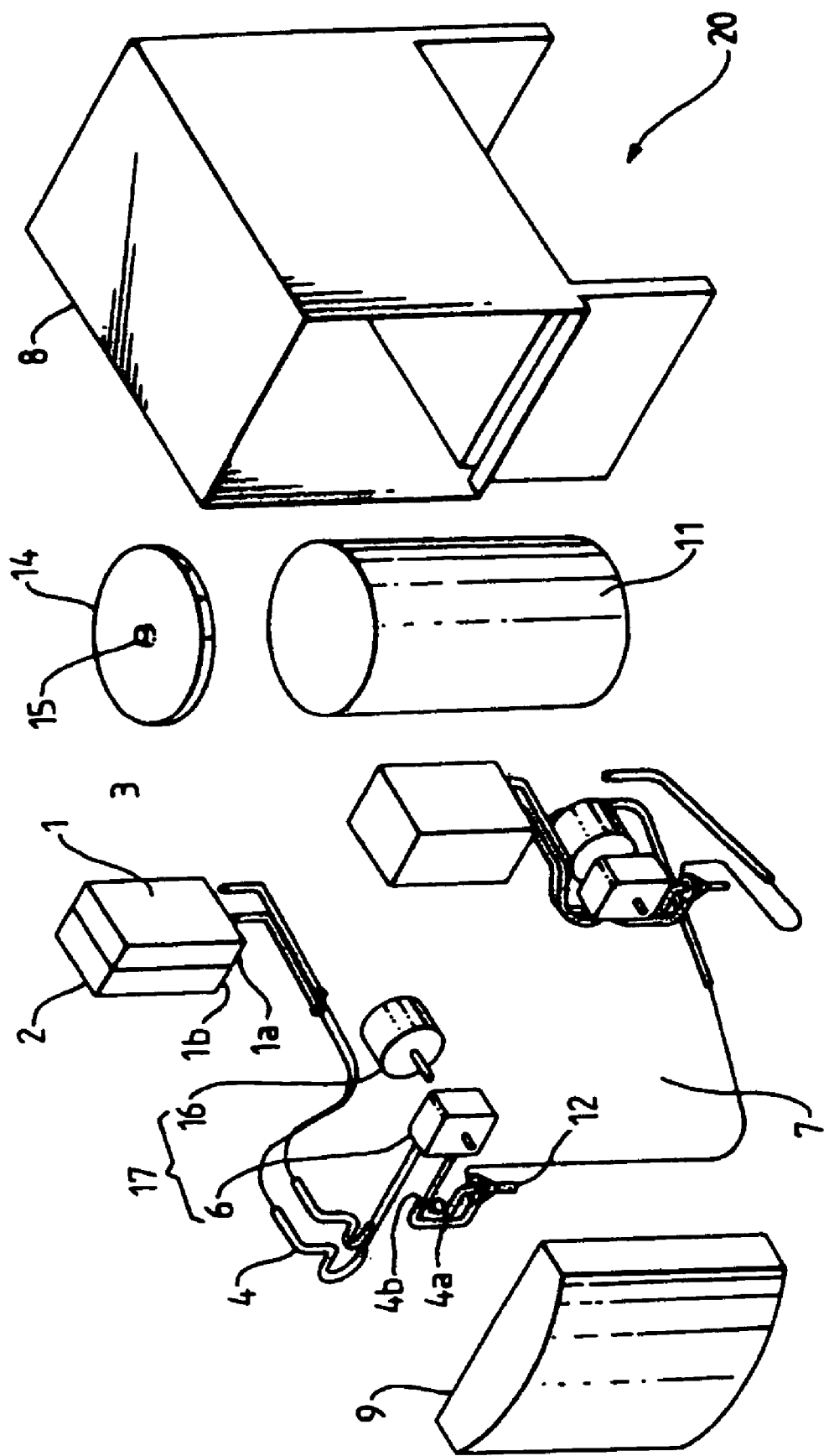
FIG. 1 shows an exploded schematic of the elements of a preferred dispensation system and how they fit together.

A suitable dispensation system according to the invention may be acquired commercially or may be fashioned by modifying an existing commercially available system in a way suitable to accommodate the necessary components described herein. Examples of suitable commercial systems or commercial systems readily modifiable by one of ordinary skill in the art include, for example, those manufactured by Karma, Inc., of Watertown, Wis., particularly Dispenser Model 670 or 672. Modification of one or more elements of commercial dispensation systems can vary depending upon many factors, for example, such as the (high) viscosity of one or more of the at least two components and/or a distinct difference in the viscosities of two of the components. Preferably, a volumetric positive displacement pump, such as a peristaltic pump, should be used and may be substituted for a different type of pump, if found in commercial dispensation systems. When two or more liquid components are used, the dispensation system may include a single-head pump for each liquid component or a smaller number of dual- or multi-head pumps. Exemplary commercial volumetric pumps for use with the invention include, but are not limited to, MityFlex peristaltic pumps, available from Anko Products, Inc., of Bradenton, Fla., and peristaltic or dispensing pumps commercially available from Watson-Marlow of Cheltenham, England.

Preferably, each of the at least two components may be packaged in its own pouch or bag, with each pouch or bag being stored in a separate compartment within a single outer chamber, for instance, in the form of a cardboard or other suitable box with a single compartment or chamber, with the at least two components being stored in a one-piece, dual compartment package, such that each compartment being connected to at least one other compartment by a suitable connection means. Alternately, the outer chamber may contain at least two chambers. Preferably, two or more pouches may be heat-sealed together, or a single pouch separated into two or more chambers or cavities by a heat-seal preferably extending from one end of the pouch to the other, to separate the at least two components from each other while keeping their receptacles together.

In a preferred embodiment, the packaging assembly contains two or more, preferably two, webs of film that can be heat-sealed to form two or more enclosures or pouches connected together in a row or in series. Preferably, the packaging assembly is capable of being folded at each heat-seal. More preferably, the folds are alternating, such that each heat-sealed end is folded back on itself, resulting in a zig-zag, or accordion, arrangement of the enclosures or pouches. Advantageously, the packaging assembly serves to keep separate the at least two components until they are dispensed.

In this way, through separation of the at least two components, it is believed that several advantages may be gained, for example, by avoiding certain shortcomings of products having components mixed prior to dosing, which disadvantages may include the following: one component may cause or accelerate the degradation or deterioration of another component, for example, during shipping or storage or within the dispensing apparatus or equipment, if the two components are mixed prior to dispensation; one component may "phase separate" from another component, for example, by settling, agglomerating, aggregating, solidifying, liquefying, forming a precipitate, forming another liquid phase, or in some other way causing an unevenly or non-uniformly mixed product to result, between the time the components are mixed together and the time the component mixture is dosed or dispensed; or both.

In another embodiment, each component enclosure or pouch, preferably of a packaging assembly, contains a dispensing fitment to allow each component to be dispensed. Each fitment may advantageously be connected to a gland in the dispensing system with any suitable connection system, i.e., gland and fitment, for example, commercial connectors, such as a CLEAN-CLIC® fitment (i.e., as disclosed in U.S. Pat. No. 5,819,986, the entire disclosure of which publications are hereby incorporated herein by reference hereto), commercially available from Innovative Packaging Netherlands, of Heemstede, The Netherlands, or a Scholle fitment, commercially available from Scholle Co., of Irvine, Calif. Preferably, the connection would possess, and the fitment would allow, a quick disconnect type function. In an alternative embodiment, the glands could be part of the packaging assembly and the fitments could be connected to the pump assembly with appropriate tubing.

The addition chamber may be any chamber, into which the at least two components may be pumped (and optionally into which a diluent may be pumped). Preferably, the chamber is suitable to allow the at least two components (and optionally the diluent) to come into contact or to allow their mixing before being dispensed as a consumable beverage. This addition of components in the chamber may result in intimate mixing, but intimate mixing is not required. The addition chamber advantageously serves as a contacting chamber for some or all of the components. In one embodiment, all the components (including the optional diluent) come into contact, or are mixed, in the addition chamber. In another embodiment, the at least two components come into contact, or are mixed, in the addition chamber, but the diluent is added later. In yet another embodiment, at least two of the components and/or diluent(s) initially come into contact, or are initially mixed, forming a component combination separate from the remaining components. In this embodiment, the initial contact or mixing may occur before, after, or in the addition chamber, with the remaining components being later brought into contact, or later being mixed, with the initial component combination.

In this invention, a preferred first component is a beverage concentrate, such as a coffee, tea or chocolate concentrate which can be added to a liquid such as water or milk to form a beverage. The second component is typically an aroma-providing component or an aroma. While the most preferred aroma is coffee aroma, the aroma-providing component in this invention is intended to be a generic definition of all types of aromas, including those aromas in aqueous or water, oil, emulsion, forms, as well as those which are encapsulated, and the like. Specific mention can be made of chocolate or cocoa aroma, tea aroma, malt, Maillard reaction flavor, or other aromas that are derived from or recovered after roasting or cooking of a raw material, foodstuff or other compounds.

The principles of the invention are now illustrated for the preferred embodiments where coffee aroma is disclosed as the most preferred aroma-providing component. Coffee aroma is used for a flavoring agent for various foods or beverages and particularly in soluble coffee, coffee concentrate and ready to drink coffee beverages to enhance the flavor, taste, and other sensory characteristics of these beverages.

There are a number of known methods for obtaining coffee aroma, and any can be utilized in this invention. Typical methods include, but are not limited to, standard instant coffee processing in which stripping, gas flushing, or other methods are used to generate and recover the aroma, the collection of gases from the grinding, heating, cooking, or other processing steps, or the extraction of the aroma from any of the processing liquids. Extraction techniques include, but are not limited to, liquid/liquid extraction, $CO_2$ extraction, oil extraction, stripping, distillation, fractionation, flashing, or gas flushing of the processing liquid to obtain the aroma. The skilled artisan knows that aromas of this type include both flavor and taste components as well as components that contribute to the perceived freshness and aromatic properties of the resultant beverage. Accordingly, the term "aroma" is used to include one or more or even all of the components that contribute to and enhance the organoleptic properties of the beverage.

The beverage product to be dispensed may include, but is not limited to, a coffee-type beverage, e.g., including coffee-based, coffee-flavored, or mocha-flavored beverages, or a mixture thereof; a carbonated beverage, e.g., such as soda, cola, flavored seltzer, or the like, or a mixture thereof; a juice beverage; another type of flavored beverage; a creamy beverage, e.g., including milk-based or non-dairy creamer-based fats or components; or a combination thereof. Preferably, the beverage product to be dispensed is a creamy and/or a coffee-type beverage, and a coffee-type beverage will be discussed herein as an exemplary but preferred embodiment of the invention.

The at least two components may be separately stored in separate containers, which are secured together, or may alternately be stored separately in separate compartments of a single container. The containers are preferably dispenser containers. In one embodiment, the at least two separate components may be a coffee base concentrate and a coffee aroma. In another embodiment, the at least two separate components may be a heavy liquor and a distillate.

The flow rate at which each compartment is emptied should be uniform and may depend upon various inherent and design characteristics, for example, such as product viscosity, compartment capacity, fitment size, and the like. Uniform emptying is important to prevent waste or improper beverage preparation. For example, if the aroma component compartment is emptied before the coffee concentrate component, then the resulting coffee will probably have an undesirable taste in the absence of aroma.

The viscosities of the different components may vary greatly, depending on, among other things, the nature of the resulting beverage and the storage or usage temperature, but all preferably fall within the range of about 0.1 cPs to 10,000 cPs. In one embodiment where two components with different viscosities are present, the ratio of the larger to the smaller viscosity is from about 200 to 5,000, preferably from about 500 to 2,000, more preferably about 1,000. In a preferred embodiment, two components are present and preferably have viscosities from about 0.1 cPs to 10 cPs and from about 200 cPs to 10,000 cPs, respectively, more preferably from about 0.5 cPs to 2 cPs and from about 500 cPs to 7,500 cPs, respectively, most preferably of about 1 cPs and from about 1,000 cPs to 5,000 cPs, respectively.

The compartment capacities of each compartment of the packaging assembly and the occupied volume of the component(s) therein may vary greatly, depending on a number of factors, e.g., such as the viscosity of the component(s) to be placed therein, the fitment size, the appropriate amount of the component(s) therein in each dispensed beverage product, and the relative ratio of the components in each of the compartments. In one embodiment, the compartment capacities and occupied volumes may be between about 50 mL and 10 L, preferably between about 100 mL and 5 L, more preferably between about 200 mL and 4 L. The occupied volume of each compartment is typically less than the compartment capacity, although they may also be substantially the same.

The size of the orifice of the fitment of each compartment according to the invention depends on factors such as the viscosity, desired flow rate, and amount of the component(s) therein, as well as the relative ratio of the components in each of the compartments.

The relative ratio of the components in each of the compartments may also vary greatly, depending on the nature of the beverage product. When only two compartments are present in the packaging assembly, it is preferable that the relative ratio of the component(s) in the two compartments is from about 20:1 to 1:20, preferably from about 10:1 to 1:10, more preferably from about 5:1 to 1:5.

The volumetric flow rates of the components in each compartment may vary greatly, depending on any of the previously stated conditions or properties, such as those indicated above. In a preferred embodiment, each volumetric flow rate is from about 1 mL/min to 100 mL/min, preferably from about 5 mL/min to 50 mL/min, more preferably about 20 mL/min to 35 mL/min.

Optionally, the dispensation system may include a piping system that connects some or all of the different elements of the dispensation system. This piping system includes any suitable type of piping or tubing, typically those made of flexible polymeric materials, for contacting and dispensing consumable beverages. Examples of suitable piping include food grade plastics, such as PTFE, PE, HDPE, PP, PVC, silicones, and the like. For example, TYGON® and NORPRENE® are two types of tubing that could be used.

Optionally, especially when the at least two components are viscous or semi-viscous liquids or concentrates, the dispensation system according to the invention may also include a means for providing a diluent for the liquids or concentrates. This diluent may be any consumable liquid, including, but not limited to, water (hot, cold, or tepid, preferably hot), carbonated water (including seltzer or club soda), a milk or non-dairy milk-type product, a solution containing any of these, or any mixture thereof. It should be understood that when the diluent is susceptible to bacterial contamination, for example, when a milk product is used as a diluent, the dispensation system should include provision for inhibiting or preventing such contamination, e.g., such as sterile piping.

The means for providing a diluent in the dispensation system according to the invention may be any suitable means, but should include a diluent container and a mechanism for providing the diluent to the at least two components upon or prior to dispensation. The diluent may be provided by any suitable method known in the art, e.g., such as the aforementioned piping detailed herein, and may be controlled, for example, using a manual or mechanically activatable valve or using a pump mechanism. In some cases, the pumping mechanism may already be included in the pumping system of the dispensation according to the invention, especially if the pump assembly includes a multi-head pump. Alternately, the mechanism for pumping may include any pump assembly and/or any piping system stated above for use in the dispensation system according to the invention. If the diluent to be provided must be kept at a particular temperature, a heating or cooling unit or both, as well as a means for monitoring and/or controlling the temperature within the diluent container may be present in the dispensation system according to the invention.

In a most preferred embodiment, the present invention provides a beverage system for providing a coffee beverage, the beverage system comprising a container including a first storage compartment containing a coffee base concentrate having a soluble coffee solids concentration of at least 10% by weight and from which coffee aroma has been removed, and a second storage compartment containing coffee aroma.

For food service applications, the coffee base concentrate and the coffee aroma may be separately stored in suitable dispenser containers. The containers may be separate for the coffee base concentrate and the coffee aroma or a single container having separate storage chambers may be used. The containers can advantageously be pouches made from, for example, barrier films which are able to keep water vapor, oxygen, and light transmission to a minimum. Suitable barrier films are commercially available, for example, containing laminated layers of polyester/aluminum/polyethylene, or the like.

For retail applications of coffee-based beverages, the two components are preferably packaged in suitable containers which have separate storage chambers for the coffee base concentrate and the coffee aroma. Suitable containers include multi-compartment stick packs; sachets; carton-based, tetrahedron packs; UNIFELL packs; squeezable plastic bottles; stand up pouches; plastic cups; etc. The containers are preferably designed such that opening of the container opens both chambers such that both the coffee base concentrate and the coffee aroma are simultaneously available for reconstitution of the beverage.

One aspect of this invention is based upon the finding that the separate storage of concentrated soluble coffee solids and coffee aroma significantly improves the stability of the concentrated soluble coffee solids. Therefore, by separately storing the coffee base concentrate and coffee aroma and recombining them upon reconstitution, a coffee beverage of improved quality is obtained compared to a coffee beverage prepared from non-separately-stored components.

The coffee base concentrate may be obtained using any suitable procedure since the exact procedure used is not critical. Usually, the coffee base concentrate is prepared by concentrating a coffee extract obtained from a coffee extraction process to the desired coffee concentration. The coffee extract may be produced in the usual manner by subjecting roasted coffee beans to extraction. Any suitable extraction procedure may be used because the choice and design of the extraction procedure is a matter of preference and has no critical impact on the invention. Suitable extraction procedures are described in U.S. Pat. Nos. 5,997,929 and 5,897,903, the disclosures of which are incorporated by reference. Similarly, any suitable concentration procedure may be used because the choice and design of the concentration procedure is a matter of preference and has no critical impact on the invention. Of course, the coffee base concentrate may also be prepared by dissolving soluble coffee powder in water to the desired concentration.

The concentration of the coffee base concentrate is at least about 10% by weight, for example at least 30% by weight. Preferably the concentration is high enough such that the concentrate will not support the growth of microorganism, for example about 50% to about 65% by weight. The concentration may be more than 65% by weight but then dispensing becomes more difficult due to increasing viscosity.

The coffee base concentrate may be treated to account for or reduce the formation of acids during storage. To account for the formation of acids during storage, the pH of the coffee base concentrate may be raised about 0.5 to 1 unit higher than original pH. The pH will still fall during storage but the coffee base concentrate will not become too acidic during acceptable shelf life times. The pH may be raised using any suitable procedure. For example, an alkali may be added to the coffee base concentrate to raise the pH. Suitable alkalis include sodium hydroxide, calcium hydroxide, potassium hydroxide and sodium bicarbonate.

Alternatively, the pH may be raised using ion exchange process with an ion exchange resins. This offers the advantage that the no additives are added to the coffee base concentrate. Alternatively, a combination of adding alkali and ion exchange can of course be performed. It is preferred that the coffee base concentrate is obtained from extract subjected to ion exchange treatment to raise pH.

It may be advantageous to store coffee base concentrate in a refrigerated or frozen condition, preferably frozen. This has the advantage that the stability of coffee base concentrate may be improved.

The formation of acids may be reduced or prevented by inducing hydrolysis of the acid precursors in the coffee base concentrate. This may be done by raising the pH to cause the acid precursors to form stable salts and then reducing the pH of the concentrate. This may be done by adding alkali as described in U.S. Pat. No. 6,054,162. Usually the pH will be raised to above about 9. The pH may again be lowered to a normal coffee pH range using suitable acids or ion exchange. Alternatively, the acid precursors may be thermally hydrolyzed or enzymatically hydrolyzed, for example by using an esterase.

The formation of acids may also be reduced or prevented by removing acid precursors from the coffee base concentrate using membrane fractionation process. It is preferred that the coffee base concentrate is obtained from extract subjected to membrane fractionation. Suitable membranes are commercially available.

It is also possible to add an alkali to the base coffee concentrate at the time of reconstitution of the beverage. This may be done by dispensing an alkali along with the base coffee concentrate.

The coffee base concentrate can be substantially free of coffee aroma. Processing the roasted coffee beans to a coffee base concentrate, as described above, will result in the loss of substantially all coffee aroma from the coffee base concentrate. However, it is preferred to specifically strip off and then collect the coffee aroma during processing. In this way, the coffee aroma is separated from the concentrate but is not lost. Processes for stripping off and collecting the coffee aroma are well known. Usually coffee aroma is stripped off at one or more stages; for example using an inert gas during, or immediately after, grinding of the coffee beans, and using steam to strip coffee aroma from the coffee extract during extraction.

Alternatively, the fresh coffee grounds may be slurried in water or coffee extract and the coffee aroma stripped from the slurry. A suitable procedure is described in U.S. Pat. No. 6,149,957, the disclosure of which is expressly incorporated by reference thereto.

The coffee aroma may be captured using any suitable procedure. Ordinarily, the coffee aroma is captured by condensing from the carrier gas it in one or more condensers. Preferably more than one condenser is used; each succeeding condenser being operated at a lower temperature than the previous condenser. If necessary or desired, one of the condensers may be a cryogenic aroma condenser. A suitable cryogenic aroma condenser is described in U.S. Pat. No. 5,182,926, the disclosure of which is expressly incorporated herein by reference thereto. The captured coffee aroma may, if desired, be concentrated using a suitable technique such as partial condensation or rectification.

The captured coffee aroma may be combined with a suitable carrier substrate such as coffee oil or an emulsion containing coffee oil.

The processes for the production of the coffee extract and capture of the coffee aroma may be carried out under oxygen reduced or oxygen free conditions if desired. This may be accomplished as is known in the art; for example by carrying out the processes under a blanket of inert gas. Further, deoxygenated water may be used whenever water is necessary in the process.

The coffee aroma is preferably stored under oxygen reduced or oxygen free conditions. Similarly, the coffee base concentrate may stored under oxygen reduced or oxygen free conditions. Further, if desired, oxygen scavengers may be added to the coffee aroma and/or coffee base concentrate. Suitable oxygen scavengers are described in U.S. Pat. No. 6,093,436, the disclosure of which is expressly incorporated herein by reference thereto. If further desired, coffee aroma can be stored under refrigerated or frozen condition. This has the advantage that the stability of the aroma may be improved.

Another way to preserve the properties of the coffee aroma is to a stabilizing agent to the aroma or to an aroma-providing component during processing, generation or storage of the aroma or the aroma-providing component. These stabilizing agents are preferably nucleophiles that contain at least one atom of sulfur or nitrogen to provide at least one tone pair of electrons for reaction with deleterious or undesirable compounds in or associated with the aroma-providing component to (a) provide increased amounts of desirable compounds that impart desirable flavor or sensory characteristics to the aroma or (b) reduce the amount of undesirable compounds that suppress desirable flavor characteristics or that contribute to or generate undesirable flavor or sensory characteristics in the aroma. The stabilizing agent is present or associated with the aroma-providing component prior to combining that component with the beverage concentrate and a liquid to form the beverage for consumption, which beverage contains an improved or enhanced aroma compared to an unstabilized aroma-providing component. Further details on these stabilizing agents and preferred methods for associating them with the aroma-providing component are described in U.S. patent publications nos. 20040076737, 20040081736, and 20040081737, each of which is expressly incorporated herein by reference thereto.

The dispensation system according to the invention may also optionally include other components that may provide some functional or aesthetic benefit. Among the optional components include a control system, a switch board, a dispenser housing, a drip pan, a hot or cold water tap, and a frame on which one or more of the elements of the dispenser system according to the invention may rest or be attached or supported.

Another aspect of the present invention involves a method for dispensing a beverage containing at least two components, preferably viscous or semi-viscous liquids or concentrates, which method includes: storing the at least two components separately in a single packaging assembly; combining the at least two components together, optionally, along with a diluent to form a consumable beverage; and dispensing the consumable beverage for consumption by a consumer, wherein at least one of the at least two components being stored in a compartment separate from at least one other of the at least two components.

In one preferred embodiment, shown in FIG. 1, the dispensation system contains a dual container 2; a pump assembly 17, containing a peristaltic pump housing 6 and a pump motor 16; an addition chamber 12 having three inlets, two for the piping, 4a and 4b, from each of the two components, and one for the piping 18 leading to the diluent tank 11; a connector assembly 19, having dual glands, 1a and 1b, for connecting to the fitments on the outer container 2; and a dispenser frame 20, including a housing 8 and a door 9.

Preferably, the dual container shown in FIG. 2 includes two component pouches, 21a and 21b, which are connected by two webs of film heat-sealed together along a sealing line 21c substantially along the median of the webs. Alternately, instead of by heat-sealing, the pouches could be adhesively secured together, for example, by any suitable adhesive or thermofusible intermediate film or hot melt material. Each component pouch includes a female pouch fitment, 22a and 22b, which advantageously protrudes outside the pouch surface and forms an orifice, 23a and 23b, of a size depending upon, among other things, the viscosity and required dispensing ratios of the components. Each fitment is configured to be securable to one gland, 1a or 1b, preferably by "push-and-lock" assembly, to enable flow from both pouches through portions of respective connecting tubes or pipes, 4a and 4b, connected to the glands, 1a and 1b. Externally, the dual container may be treated as one single packaging assembly. The packaging assembly can be placed in the dispensation system very conveniently to allow dispensation of the components to form a beverage product. In an alternative embodiment (not shown), the two pouches could fold over, preferably substantially at the median or at the heat-seal, so that the two fitments are situated coaxially, thus allowing connection to a single dispensing gland to enable flow therefrom.

Alternatively, as shown in FIG. 3, the component pouches, 21a and 21b, are stored as two separate members in a single container 2. Each component pouch has a female pouch fitment, 22a and 22b. These pouch fitments, 22a and 22b, can connect to the dual glands, 1a and 1b, preferably with a quick-disconnect type release mechanism.

The fluid flow couplings may preferably include those of the "dry break" type, for example, such as those disclosed in U.S. Pat. Nos. 5,609,195, 5,467,806, and 5,816,298. More particularly, the fluid flow couplings refer to a connection between a first, male part and a second, female part, through which connection fluid may flow. When the couplings parts are disconnected, they mutually reseal to prevent loss of fluid from either tubing(s) or container(s). Additionally, the "dry break" aspect of these couplings implies a desirably minimal fluid retention volume, so that fluid is not sealed in either the first or second coupling parts, thus minimizing exposure to, or release into, ambient conditions.

The term "about," as used herein with respect to a range of values, should be understood to modify either value stated in the range, or both.

EXAMPLES

The following examples are only representative of the methods and materials for use in dispensation systems according to the invention or any element(s) thereof, and are not to be construed as limiting the scope of the invention in any way.

Example 1

Roast and ground coffee was fed into a slurry tank along with a coffee extract containing about 8 to 10% by weight of soluble coffee solids. The resulting slurry was fed to the top of a disc and donut stripping column using a slurry pump. Steam at a low pressure of less than about 20 kpa (gauge) was fed into the bottom of the stripping column. The stripping rate was 50% by weight of steam compared to roast and ground coffee.

The aromatized gas stream leaving the stripping column was subjected to concentration by rectification in a packed rectification column. The liquid condensing in the rectification condenser was collected and comprises about 10% by weight of the roast and ground coffee. The coffee aroma was placed in glass vials and protected from oxygen.

The stripped slurry leaving the stripping column was then subjected to extraction in a continuous extraction system made up of three extraction reactors and two solubilization reactors. The system is as described in U.S. Pat. No. 5,897,903, which has been incorporated by reference. The extraction reactors are operated at 120° C., 110° C., and 110° C., respectively. The solubilization reactors are operated at 1.75 MPa for 5 minutes and 1.75 MPa for 8 minutes respectively. The water used in the extraction system was deoxygenated and an inert blank was used with the system to reduce oxygen ingress.

The extract obtained is called stripped extract. This stripped extract was further concentrated using a evaporation system to provide a coffee base concentrate containing about 55% by weight of soluble coffee solids. About 0.75% to 1% of sodium hydroxide (by weight relative to coffee solids) was added to the coffee base concentrate. This amount of Sodium hydroxide was sufficient to neutralize acid formation over a period of 6 months. The coffee base concentrate was then filled in glass vials and held under inert gas conditions.

Three sample groups were prepared for storage. For the control group, coffee base concentrate was combined with coffee aroma at a level of about 10% coffee aroma and frozen at −40° C. The coffee base concentrate and coffee aroma were protected from oxygen during the process.

The prior art formulation was made by combining coffee base concentrate with coffee aroma at a level of about 10% coffee aroma and filled into glass vials. The coffee base concentrate and coffee aroma were protected from oxygen during the process.

For Example 1, the coffee base concentrate and coffee aroma were separately stored in the glass vials. The vials of the prior art formulation and Example 1 were stored at 20° C. under an inert gas for up to 6 months.

A coffee beverage was prepared from each sample group over the period of the storage trial and evaluated by a panel using the "Difference from Control" sensory evaluation method. When preparing beverages of Example 1, about 10% by weight coffee aroma was added to the base coffee concentrate. Each of the storage samples was evaluated against to the frozen control. Each panelist gives a score between 1 and 10 to indicated the degree of difference. If the score is 9 and 10, this means that the panelist could not tell the storage sample as being different from frozen control. If the score is between 6 to 8, a difference from frozen control is detected but the difference is acceptable. If the score is below 6, the difference between the storage sample and the frozen control is not acceptable. If a score below 9 is given, each panelist is asked to describe the differences under the following attributes: cloudiness, coffeeness, roastyness, pruneyness/molasses, acidity, bitterness and body. Panelists are also free to use other attributes to describe the differences. At the end of evaluation, the panel give a consensus score for the samples being evaluated.

The beverages prepared from the samples of Example 1 scored values of 6 to 8 during the trial. After six month storage, the differences are (1) less coffeeness, (2) less roastyness and (3) some development of green, woody characteristics. However, the differences are acceptable. The beverages prepared from the prior art formulation scored values of less than 6 and were not acceptable.

Example 2

The process of Example 1 was repeated except that, instead of adding sodium hydroxide to the coffee base concentrate, the stripped extract was subjected to membrane fractionation process, specifically ultra-filtration, using a membrane with a 3.5K molecular cut off such that about 25% of coffee solids was removed in the permeate. It is preferred to membrane fractionate the stripped extract to prevent loss of aroma during processing. And then the retentate was further evaporated to form coffee base concentrate. The coffee base concentrate and coffee aroma were separately stored in the glass vials. The beverages prepared from the coffee base concentrate and coffee aroma of Example 2 scored values of 6 to 8 during the trial.

Example 3

The process of Example 1 was repeated except that, instead of adding Sodium hydroxide to the coffee base concentrate, the stripped extract was passed through an ion exchange column containing DOWEX 22 resins to raise the pH to a value equivalent to the addition of 1% sodium hydroxide (by weight relative to coffee solid). It is preferred to use stripped extract to minimize the damage of coffee aroma during processing. The treated stripped extract was further evaporated to form coffee base concentrate. The coffee base concentrate and coffee aroma were separately stored in the glass vials. The beverages prepared from the coffee base concentrate and coffee aroma scored values of 6 to 8 during the trial.

Example 4

The process of Example 1 was repeated except that the coffee aroma was stored under frozen condition. The beverages prepared from the coffee base concentrate and the frozen stored coffee aroma scored values of 6 to 8 during the trial.

Example 5

The coffee base concentrate and the coffee aroma of Example 1 were each inoculated with a microbial cocktail containing 32 yeast, 22 mold and 15 lactic acid bacteria strains. The samples were stored at 20° C. No growth was detected and all organisms had ceased to be viable after two weeks or longer.

Example 6

A packaging assembly according to the invention contains two compartments, A and B, each with a compartment capacity of slightly greater than 1 liter and each possessing an attached fitment with an orifice having a diameter of about 4 mm. In compartment A is a coffee concentrate having a viscosity between about 1,000 cPs and 5,000 cPs. In compartment B is a coffee aroma distillate having a viscosity of about 1 cPs. In this case, the relative ratio of the coffee concentrate to the coffee aroma in the beverage product is about 1:1.

Example 7

A dispensation system according to the invention contains the packaging assembly of Example 6, as well as connecting glands, a dual head pump assembly, mixing chamber, diluent tank, and connective tubing.

Example 8

A beverage product provided by the dispensation system of Example 7 can advantageously be dispensed according to a method of the invention. As such, the two components are pumped at a predetermined flow rate of about 30 mL/min into a mixing chamber of the dispensation system, in which they are mixed together and diluted with about 170 mL of hot water (temperature of about 70° C. to 90° C.). The resulting mixture is then dispensed for consumption.

While the foregoing description represents the preferred embodiments of the present invention, it will be understood that various additions and/or substitutions may be made therein without departing from the spirit and scope of the present invention. One skilled in the art will appreciate that the invention may be used with many modifications of structure, forms, arrangement, proportions, materials, and components used in the practice of the invention and which are particularly adapted to specific environments and operative requirements, without departing from the principles of the present invention. The presently disclosed embodiments are therefore to be considered in all respects as illustrative and not restrictive.

What is claimed is:

1. A beverage system for providing a beverage, comprising:
   a dispenser;
   a liquid beverage-forming concentrate stored in the dispenser; and
   an aroma or aroma-providing component that is stored in the dispenser separately from the concentrate;
   wherein the concentrate and aroma are combinable upon reconstitution of the concentrate for providing the beverage for dispensing and on-premise consumption; and
   wherein the concentrate has a viscosity of about 200 cPs to 10,000 cPs, the aroma or aroma providing component has a viscosity of about 0.1 cPs to 10 cPs and the viscosities of the concentrate and aroma or aroma-providing component are provided in a ratio of about 500 to 2,000.

2. The beverage system of claim 1, wherein the concentrate is a tea and the aroma or aroma-providing component comprises tea aroma.

3. The beverage system of claim 1, wherein the concentrate is a coffee base concentrate has a soluble coffee solids concentration of about 50% to about 65% by weight.

4. The beverage system of claim 1, wherein the concentrate includes an alkali in an amount sufficient to reduce the pH of the concentrate by at least 0.5 pH units.

5. The beverage system of claim 1, wherein the aroma or aroma-providing component comprises coffee aroma.

6. The beverage system of claim 1, wherein the aroma or aroma-providing component further comprises a stabilizing agent in an amount effective to (a) provide increased amounts of desirable compounds that impart desirable flavor or sensory characteristics to the aroma or aroma-providing component, or (b) reduce the amount of undesirable compounds that suppress desirable flavor characteristics or that contribute to or generate undesirable flavor or sensory characteristics in the aroma or aroma-providing component.

7. The beverage system of claim 1, wherein the concentrate, the aroma or aroma-providing component, or both components further include an oxygen scavenger.

8. The beverage system of claim 1, wherein the concentrate, the aroma or aroma-providing component, or both components are stored under frozen conditions.

9. The beverage system of claim 1, wherein the concentrate and aroma or aroma-providing component are each stored in a separate dispenser container.

10. The beverage system of claim 9, in which each container is a pouch comprising barrier films.

11. The beverage system of claim 9, wherein the concentrate is stored in a first storage compartment and the aroma or aroma-providing component is stored in a second storage compartment of a dispenser container.

12. The beverage system of claim 11, wherein each storage compartment forms part of a pouch comprising barrier films.

13. The beverage system of claim 1, which further comprises a fluid for reconstitution of the concentrate.

14. The beverage system of claim 13, further comprising an addition chamber for combining the concentrate, aroma or aroma-providing component and fluid to form the beverage.

15. The beverage system of claim 14, wherein the fluid is water, carbonated water, milk or a non-dairy milk product, the concentrate comprises coffee, tea, chocolate, milk, fruit juice or a combination thereof, the aroma or aroma-providing component is coffee aroma, tea aroma, chocolate or cocoa aroma, malt, Maillard reaction flavor, or a combination thereof, and the beverage is coffee, tea, a carbonated drink, a fruit juice, milk, or a non-dairy creamer, or a combination thereof.

16. The beverage system of claim 1, wherein the concentrate has a viscosity of about 500 cPs to 7,500 cPs, the aroma or aroma providing component has a viscosity of about 0.5 cPs to 2 cPs and the viscosities are provided in a ratio of about 500 to 2,000.

17. A beverage system for providing a beverage, comprising:
   a dispenser;
   a liquid beverage-forming concentrate stored in the dispenser;
   an aroma or aroma-providing component stored in the dispenser separately from the concentrate;
   a fluid for reconstituting the concentrate; and
   an addition chamber for combining the concentrate, aroma or aroma-providing component and fluid to form the beverage;

wherein the concentrate has a viscosity of about 500 cPs to 7,500 cPs, the aroma or aroma providing component has a viscosity of about 0.5 cPs to 2 cPs, the viscosities of the concentrate and aroma or aroma-providing component are provided in a ratio of about 500 to 2,000, the concentrate and aroma are combinable upon reconstitution of the concentrate for providing the beverage for dispensing and on-premise consumption, and the beverage exhibits improved organoleptic properties compared to beverages that do not contain the additional aroma or aroma-providing component.

18. The beverage system of claim 17, wherein the concentrate and aroma or aroma-providing component are combined at volumetric flow rates that are between about 20 mL/min to 35 mL/min.

* * * * *

UNITED STATES PATENT AND TRADEMARK OFFICE
CERTIFICATE OF CORRECTION

PATENT NO. : 7,597,922 B2  
APPLICATION NO. : 10/978279  
DATED : October 6, 2009  
INVENTOR(S) : Cheng et al.

It is certified that error appears in the above-identified patent and that said Letters Patent is hereby corrected as shown below:

Title Page:
Item (75) Inventors, change the country of residence of Christian Milo from "(DE)" to -- (CH) --.

Item (63) Related U.S. Application Data, after "Pat. No. 7,223,426," insert -- which is a continuation of application No. PCT/EP02/00770 filed on Jan. 22, 2002, --; after "Pat. No. 7,060,315," insert -- which is a continuation of application No. PCT/EP02/03027 filed on Mar. 13, 2002, --; after "Pat. No. 6,960,362," insert -- which is a continuation of PCT/EP02/03026 filed on Mar. 13, 2002, --; after "Pat. No. 7,056,545," delete "which is a continuation of application No. PCT/EP02/03027, filed on Mar. 13, 2002, which is a continuation of application No. PCT/EP02/03026, filed on Mar. 13, 2002,".

> The "Related U.S. Application Data" will then correctly appear as follows: "Continuation-in-part of application No. 10/626,369, filed on Jul. 23, 2003, now Pat. No. 7,223,426, which is a continuation of application No. PCT/EP02/00770, filed on Jan. 22, 2002, which is a continuation of application No. 09/768,784, filed on Jan. 25, 2001, now Pat. No. 6,756,069, which is a continuation-in-part of application No. 09/453,932, filed on May 16, 2000, now Pat. No. 6,319,537, application No. 10/978,279, which is a continuation-in-part of application No. 10/661,432, filed on Sep. 11, 2003, now Pat. No. 7,060,315, which is a continuation of PCT/EP02/03027, filed on Mar. 13, 2002, and a continuation-in-part of application No. 10/661,397, filed on Sep. 11, 2003, now Pat. No. 6,960,362, which is a continuation of PCT/EP02/03026, filed on Mar. 13, 2002, and a continuation-in-part of application No. 10/661,388, filed on Sep. 11, 2003, now Pat. No. 7,056,545, which is a continuation of PCT/EP02/02866, filed on Mar. 13, 2002."

Item (56) References Cited, FOREIGN PATENT DOCUMENTS, change "GB 2 057 894" to -- 2 057 849 --.

UNITED STATES PATENT AND TRADEMARK OFFICE
CERTIFICATE OF CORRECTION

PATENT NO. : 7,597,922 B2
APPLICATION NO. : 10/978279
DATED : October 6, 2009
INVENTOR(S) : Cheng et al.

It is certified that error appears in the above-identified patent and that said Letters Patent is hereby corrected as shown below:

Column 1:
Line 9, after "U.S. Pat. No. 7,223,426," insert -- which is a continuation of PCT/EP02/00770, filed Jan. 22, 2002, --.

Signed and Sealed this

Twenty-fourth Day of November, 2009

David J. Kappos
*Director of the United States Patent and Trademark Office*